United States Patent
Childress, Jr. et al.

(10) Patent No.: US 11,676,369 B2
(45) Date of Patent: *Jun. 13, 2023

(54) CONTEXT BASED TARGET FRAMING IN A TELECONFERENCING ENVIRONMENT

(71) Applicant: Plantronics, Inc., Santa Cruz, CA (US)

(72) Inventors: Rommel Gabriel Childress, Jr., Cedar Park, TX (US); Alain Elon Nimri, Austin, TX (US); Stephen Paul Schaefer, Cedar Park, TX (US); David Young, Austin, TX (US)

(73) Assignee: Plantronics, Inc., Santa Cruz, CA (US)

( * ) Notice: Subject to any disclaimer, the term of this patent is extended or adjusted under 35 U.S.C. 154(b) by 238 days.

This patent is subject to a terminal disclaimer.

(21) Appl. No.: 17/129,145

(22) Filed: Dec. 21, 2020

(65) Prior Publication Data

US 2021/0235040 A1     Jul. 29, 2021

Related U.S. Application Data

(63) Continuation of application No. 16/773,421, filed on Jan. 27, 2020, now Pat. No. 10,904,485.

(51) Int. Cl.
| | |
|---|---|
| *G06V 10/764* | (2022.01) |
| *H04N 7/15* | (2006.01) |
| *H04N 7/04* | (2006.01) |
| *G06V 20/40* | (2022.01) |
| *G06V 40/16* | (2022.01) |
| *G06V 10/82* | (2022.01) |

(52) U.S. Cl.
CPC ............ *G06V 10/764* (2022.01); *G06V 10/82* (2022.01); *G06V 20/46* (2022.01); *G06V 40/161* (2022.01); *G06V 40/171* (2022.01); *H04N 7/04* (2013.01); *H04N 7/15* (2013.01)

(58) Field of Classification Search
None
See application file for complete search history.

(56) References Cited

U.S. PATENT DOCUMENTS

| | | | |
|---|---|---|---|
| 6,593,956 B1 | 7/2003 | Potts et al. | |
| 9,843,761 B2 | 12/2017 | Thompson et al. | |
| 9,912,905 B2 | 3/2018 | Yin et al. | |
| 9,912,908 B2 | 3/2018 | Wang | |
| 9,942,516 B1 * | 4/2018 | Pell | ......... H04L 65/80 |
| 9,942,518 B1 | 4/2018 | Tangeland et al. | |

(Continued)

FOREIGN PATENT DOCUMENTS

CN         107786834 A       3/2018

OTHER PUBLICATIONS

Burrows, T. D.; "Television Production: Disciplines and Techniques." McGraw-Hill Higher Education. Figure 6-15, (1991) 5th Edition, ISBN-139780697129178.

*Primary Examiner* — Stella L. Woo
(74) *Attorney, Agent, or Firm* — Quarles & Brady LLP

(57) ABSTRACT

A method for determining camera framing in a teleconferencing system comprises a process loop which includes acquiring an audio-visual frame from a captured a video data frame; detecting objects and extracting image features of the objects within the video data frame, ingesting the audio-visual frame into a context-based audio-visual map in an intelligent manner, and selecting targets from within the map for inclusion in an audio-video stream for transmission to a remote endpoint.

20 Claims, 9 Drawing Sheets

(56) References Cited

U.S. PATENT DOCUMENTS

| | | | |
|---|---|---|---|
| 10,091,412 B1 | 10/2018 | Feng et al. | |
| 10,122,972 B2 | 11/2018 | Feng | |
| 10,148,913 B2 | 12/2018 | Nimri et al. | |
| 10,187,579 B1 | 1/2019 | Wang et al. | |
| 10,447,970 B1 | 10/2019 | Chu | |
| 10,491,809 B2 | 11/2019 | Feng et al. | |
| 10,574,899 B2 | 2/2020 | Wang et al. | |
| 10,582,117 B1* | 3/2020 | Tanaka | H04N 7/15 |
| 10,904,485 B1* | 1/2021 | Childress, Jr. | H04N 7/15 |
| 2012/0320143 A1 | 12/2012 | Chu et al. | |
| 2019/0199967 A1* | 6/2019 | Tangeland | G06V 40/161 |
| 2019/0341054 A1 | 11/2019 | Krupka et al. | |

* cited by examiner

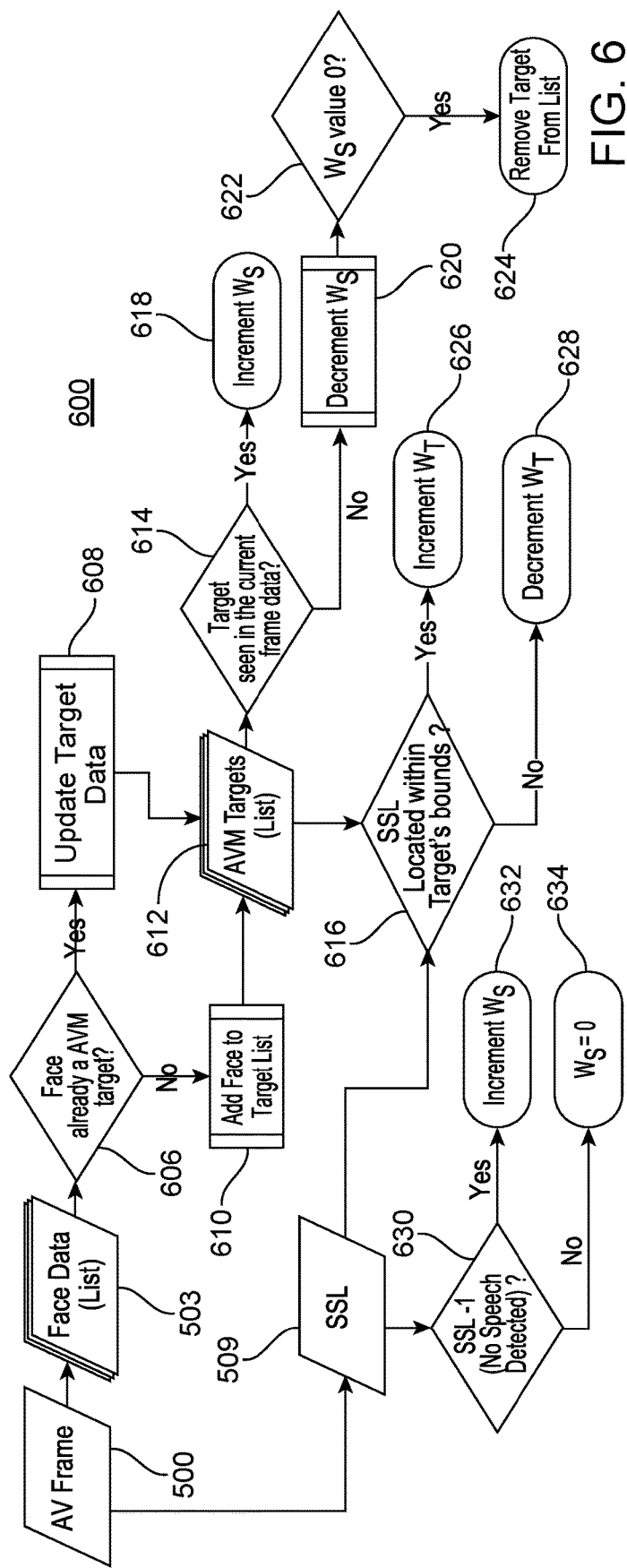
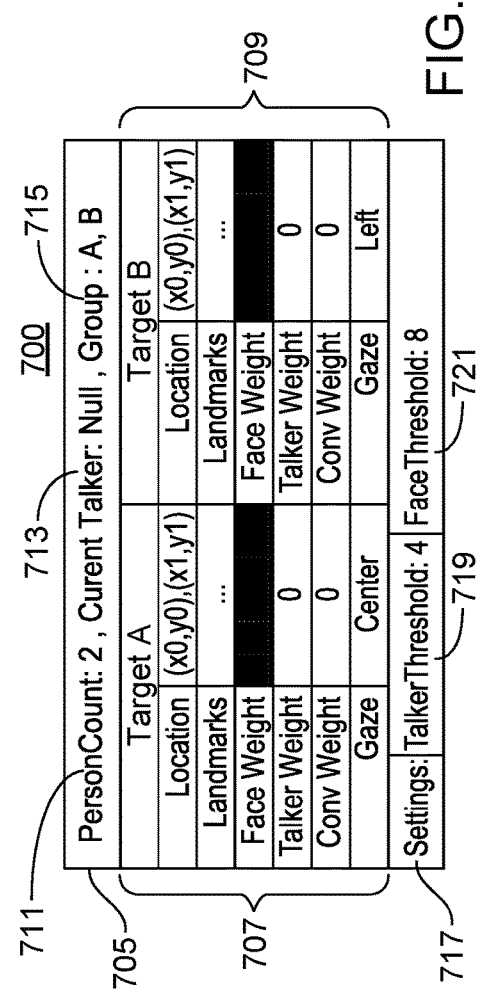
FIG. 6
FIG. 7

CONTEXT BASED TARGET FRAMING IN A TELECONFERENCING ENVIRONMENT

CROSS-REFERENCE TO RELATED APPLICATION

This application claims priority benefit of U.S. patent application Ser. No. 16/773,421, which was filed on Jan. 27, 2020, and the contents of which are entirely incorporated by reference herein.

TECHNICAL FIELD

This disclosure relates generally to videoconferencing and relates particularly to state systems which optimize selection of audio-visual data from within one or more captured audio-visual streams for rendering.

BACKGROUND

During a videoconference, people at a videoconferencing endpoint interact with people at one or more other videoconferencing endpoints. There exist systems to capture views of conference participants from different angles. Timer-based solutions which automatically select and frame view(s) for transmission to a remote endpoint have not been wholly satisfactory. Thus, there is room for improvement in the art.

SUMMARY

In accordance with an example of this disclosure, a method of selecting sub-frames of video information for rendering in a teleconferencing system includes receiving, from a camera device, a video data frame; detecting a presence, within the video data frame, of data indicative of a face; designating a portion of the video data frame as a target region based on the data indicative of the face; receiving, from a microphone device, an audio data frame, the audio data frame associated in time with the video data frame, the audio data frame indicative of a sound source location; updating an audio-visual map, the audio-visual map corresponding to a plurality of earlier video data frames and audio data frames associated therewith, wherein updating the audio-visual map comprises: determining that the target region corresponds to a first target of the audio-visual map, the first target corresponding to a meeting participant, incrementing a facial weight value of the first target, responsive to determining that the target region corresponds to the first target, determining that the sound source location corresponds to the first target, and incrementing a first talker weight value of the first target, responsive to determining that the sound source location corresponds to the first target; selecting one or more sub-frames of the video data frame, wherein selecting one or more subframes comprises: selecting a first sub-frame depicting the first target when the facial weight value exceeds a first threshold, and selecting a second sub-frame depicting the first target when the first talker weight value exceeds a second threshold; and including the first sub-frame and the second sub-frame in an audio-video stream for transmission to a remote endpoint.

An example of this disclosure is a non-transitory computer readable medium storing instructions executable by a processor, wherein the instructions comprise instructions to: receive, from a camera device, a video data frame; detect a presence, within the video data frame, of data indicative of a face; designate a portion of the video data frame as a target region based on the data indicative of the face; receive, from a microphone device, an audio data frame, the audio data frame associated in time with the video data frame, the audio data frame indicative of a sound source location; update an audio-visual map, the audio-visual map corresponding to a plurality of earlier video data frames and audio data frames associated therewith, wherein the instructions to update the audio-visual map comprise instructions to: determine that the target region corresponds to a first target of the audio-visual map, the first target corresponding to a meeting participant, increment a facial weight value of the first target, responsive to determining that the target region corresponds to the first target, determine that the sound source location corresponds to the first target, and increment a first talker weight value of the first target, responsive to determining that the sound source location corresponds to the first target; select one or more sub-frames of the video data frame, wherein the instructions to select one or more subframes comprise instructions to: select a first sub-frame depicting the first target when the facial weight value exceeds a first threshold, and select a second sub-frame depicting the first target when the first talker weight value exceeds a second threshold; and render, one or more selected sub-frames using at least one display device.

Another example of this disclosure includes a teleconferencing endpoint, comprising: teleconferencing endpoint, comprising: a network interface; a camera device; a microphone device; a processor, the processor coupled to the network interface, the camera device and the microphone device; a memory, the memory storing instructions executable by the processor, wherein the instructions comprise instructions to: receive, from the camera device, a video data frame; detect a presence, within the video data frame, of data indicative of a face; designate a portion of the video data frame as a target region based on the data indicative of the face; receive, from the microphone device, an audio data frame, the audio data frame associated in time with the video data frame, the audio data frame indicative of a sound source location; update an audio-visual map, the audio-visual map corresponding to a plurality of earlier video data frames and audio data frames associated therewith, wherein the instructions to update the audio-visual map comprise instructions to: determine that the target region corresponds to a first target of the audio-visual map, the first target corresponding to a meeting participant, increment a facial weight value of the first target, responsive to determining that the target region corresponds to the first target, determine that the sound source location corresponds to the first target, and increment a first talker weight value of the first target, responsive to determining that the sound source location corresponds to the first target; select one or more sub-frames of the video data frame, wherein the instructions to select one or more subframes comprise instructions to: select a first sub-frame depicting the first target when the facial weight value exceeds a first threshold, and select a second sub-frame depicting the first target when the first talker weight value exceeds a second threshold; and transmit an audio-video stream containing the first sub-frame and the second sub-frame to a remote endpoint using the network interface.

BRIEF DESCRIPTION OF THE DRAWINGS

For illustration, there are shown in the drawings certain examples described in the present disclosure. In the drawings, like numerals indicate like elements throughout. The full scope of the inventions disclosed herein are not limited to the precise arrangements, dimensions, and instruments shown. In the drawings:

FIG. 6 illustrates a method of ingesting an audio-visual frame into an audio-visual map, in accordance with an example of this disclosure;

FIG. 7 illustrates an audio-visual map, in accordance with an example of this disclosure;

DETAILED DESCRIPTION

Figure 1:
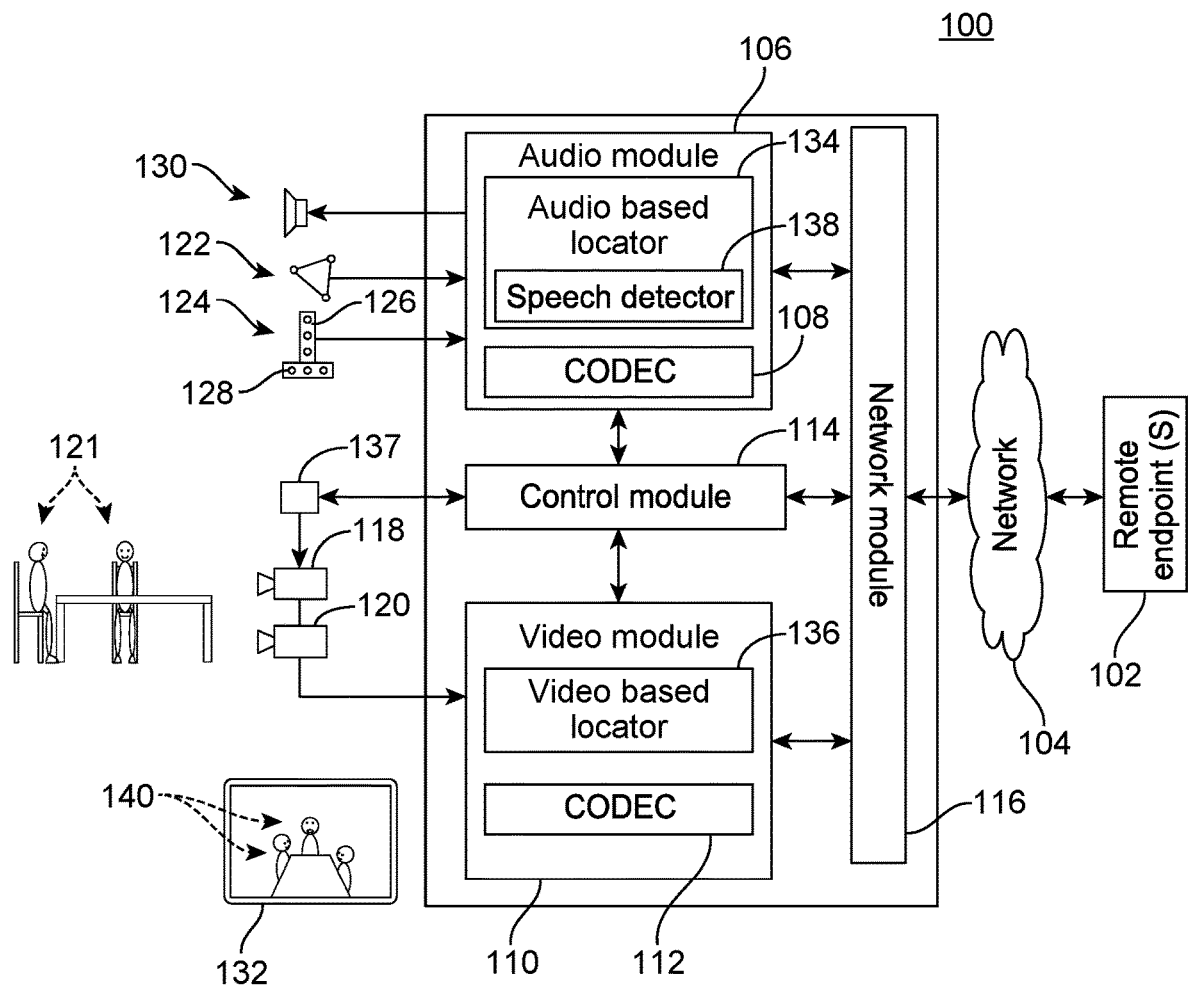
FIG. 1 illustrates a videoconferencing endpoint, in accordance with an example of this disclosure.

In the drawings and the description of the drawings herein, certain terminology is used for convenience only and is not to be taken as limiting the examples of the present disclosure. In the drawings and the description below, like numerals indicate like elements throughout.

Terms

Throughout this disclosure, terms are used in a manner consistent with their use by those of skill in the art, for example:

Computer vision is an interdisciplinary scientific field that deals with how computers can be made to gain high-level understanding from digital images or videos. Computer vision seeks to automate tasks imitative of the human visual system. Computer vision tasks include methods for acquiring, processing, analyzing and understanding digital images, and extraction of high-dimensional data from the real world in order to produce numerical or symbolic information. Computer vision is concerned with artificial systems that extract information from images. Computer vision includes algorithms which receive a video frame as input and produce data detailing the visual characteristics that a system has been trained to detect.

The term computer vison map (also referred to herein as an audio-visual map) includes one or more data structures which receive audio-visual frames as input, stores data pertaining to one or more targets within the audio-visual frames, and tabulates temporal data relating thereto. In some examples of this disclosure, such data structures, target information, and temporal information is used by decision making algorithms to select audio-visual data for a teleconferencing endpoint.

A convolutional neural network is a class of deep neural network which can be applied analyzing visual imagery. A deep neural network is an artificial neural network with multiple layers between the input and output layers.

Artificial neural networks are computing systems inspired by the biological neural networks that constitute animal brains. Artificial neural networks exist as code being executed on one or more processors. An artificial neural network is based on a collection of connected units or nodes called artificial neurons, which mimic the neurons in a biological brain. Each connection, like the synapses in a biological brain, can transmit a 'signal' to other neurons. An artificial neuron that receives a signal then processes it and can signal neurons connected to it. The signal at a connection is a real number, and the output of each neuron is computed by some non-linear function of the sum of its inputs. The connections are called edges. Neurons and edges have weights, the value of which is adjusted as 'learning' proceeds and/or as new data is received by a state system. The weight increases or decreases the strength of the signal at a connection. Neurons may have a threshold such that a signal is sent only if the aggregate signal crosses that threshold.

Object-oriented programming is a programming methodology based on 'objects' which can contain data, in the form of fields and code, in the form of procedures. An object's procedures can access and modify the data fields of the object with which they are associated. Computer programs can comprise objects that interact with one another.

The term video frame can include a still image captured by a video stream or camera.

The term audio visualization process can include one or more system processes which evaluate data from microphones to generate an acoustic 'view' of a room or other such endpoint location.

The term sound source location can refer to a value produced by a system's audio visualization process which is indicative of a horizontal position of a current sound source.

The term audio-visual frame can refer to one or more blocks of data containing computer vision information and audio process information generated at (or corresponding to) a specific moment in time.

The term target can refer to one or more subjects of interest which are tracked using an audio-visual map.

The term television production rules algorithm refers to algorithms designed to automate camera controls based on data collected at an endpoint, applications of machine learning to such collected data, and applications of computer vision processes to such data.

Discussion

In accordance with one or more examples of this disclosure computer vision technology is used to control inputs and outputs of one or more cameras. In at least one example, a camera captures images and uses machine learning algorithms to perform object classification tasks, such as facial recognition. Output from such algorithms and tasks is forwarded to other processes within a computing system of a teleconferencing endpoint. In some examples, processes perform tasks such as people counting and auto-framing.

In at least one example of this disclosure, a system identifies and tracks people at an endpoint, by detecting data indicative of one or more person's being in a camera's field of view, such as data relating to faces, body shapes, and/or other features.

In at least one example of this disclosure, a camera captures images at speeds of 30 frames each second or faster. In many instances, a computer vision system classifies data objects at (often substantially) slower speed. In one or more examples of this disclosure, the speed at which a processor can perform computer vision tasks depends on inherent speed of the processor itself and the extent to which the processor is currently performing non-computer vision tasks. In some examples, a computer vision system will require between 400 milliseconds and 2.5 seconds to track and classify data objects of a single video data frame. In at least one example, a video data frame corresponds to a sample of the data captured using an optical sensor such as a camera at that optical sensor's sampling rate. Thus, a video data frame can, like a traditional photograph, correspond to an 'instant' of time. In some examples, a video data frame corresponds to a plurality of frames captured over a short period of time.

Examples of this disclosure pertain to augmenting one or more current computer vision processes and/or data with contextual information derived earlier computer vision processes and/or data. Examples of this disclosure reduce that likelihood that subjects will be improperly identified because of obstructions, poor positioning, motion-induced blurring, and that a camera control system will behave erratically and/or erroneously due to improper identification and/or tracking of subjects.

The relatively low frame rate computer vision data can be catalogued and recorded in memory in such a way as to provide a contextual history which can be evaluated in real time to infer certain key subjects of interest and better inform the application algorithms which make behavioral decisions.

In one or more examples of this disclosure, a subject of interest is determined based on multiple factors. In at least one example of this disclosure, a videoconferencing device can detect and focus on an active talker. One or more microphone arrays can be used to determine the direction from the videoconferencing device to the active talker. In one or more examples of this disclosure, one or more cameras are used to locate the face of an active talker. In some examples, sound source localization is used to detect an active talker. In some examples, body detection is used to detect an active talker. In some examples, lip motion detection is used to locate the current speaker. In at least one example, the current speaker is located, one or more cameras can be automatically directed toward him or her. A view of the active talker can be captured for transmission to another endpoint and the active talker can be tracked during a videoconference.

In some examples of this disclosure, other bases for selecting one or more views (or portions of views) for rendering are utilized. In at least one example, a diagram at an endpoint will be the subject of interest when a speaker refers to the diagram. In at least one example, a meeting participant at an endpoint with a speaker will be the subject of interest when the speaker addresses that participant. In at least one example, an object will be the subject of interest when the speaker makes hand gestures directed towards the object. In at least one example, a meeting participant at an endpoint with a speaker will be the subject of interest when the speaker discusses that meeting participant in the third person. In accordance with examples of this disclosure, one or more views depicting the subject of interest will be transmitted to a remote endpoint for viewing.

Aspects of this disclosure pertain to optimizing how a subject of interest is framed. At least one example of this disclosure is directed to determining where to locate a subject of interest within a frame. In at least one example, when the subject of interest is a person who has at least one eye in a capturing camera's field of view, the degree to which that person is placed away from the centroid of a rendered frame is a function of the degree to which that person is looking away from the capturing camera.

In at least one example of this disclosure, an object or person will be a subject of interest when most participants at an endpoint look at that object or person. In at least one example of this disclosure, an object or person will be a subject of interest when a plurality of participants at an endpoint looks at that object or person.

In at least one example of this disclosure, head pose estimation is used as a cue to find the object or person at which participants are looking. In at least one example, eye gaze estimation is used as a cue to find the object or person at which participants are looking. In at least one example of this disclosure, head pose estimation and eye gaze estimation are used as cues to find the object or person at which participants are looking. In at least one example, a voting module takes head pose and eye gaze estimation data and finds the "hot areas" that are currently grabbing people's attention. In some examples, an object detection module determines whether there are objects about the "hot areas." Objects may be people or things, such as, whiteboards, screens, flipcharts, or products.

In at least one example of this disclosure, a decision will be to present a view containing the subject of interest. Presenting the view can include switching from an earlier view. Switching the view can include switching between cameras, panning or zooming (mechanically or electronically) one of the cameras, switching to a content stream, switching to the output of a smart board, and switching to a dedicated white board camera.

In at least one example of this disclosure, a focus target estimation model is used to determine subjects of interest so that those subjects can be properly framed within images of a data stream. In this example, focus target estimation is performed by a neural network trained to take an input image and output an audio-visual map.

In accordance with examples of this disclosure, once a subject of interest has been identified, a determination is made as to how to display the subject of interest in an optimized manner. Technical benefits of determining areas of interest within meeting spaces include helping to determine what kind of meeting space makes meetings more efficient, determining how to reduce distractions, and deciding for how long to schedule a meeting.

FIG. 1 illustrates a videoconferencing endpoint 100 in accordance with an example of this disclosure. The videoconferencing apparatus or endpoint 100 communicates with one or more remote endpoints 102 over a network 104. Components of the endpoint 100 include an audio module 106 with an audio codec 108 and has a video module 110 with a video codec 112. Modules 106, 110 operatively couple to a control module 114 and a network module 116. In one or more examples, endpoint 100 includes exactly one wide angle electronic-pan-tilt-zoom camera. In some examples, when a view subject is zoomed in upon, a sub-portion of the captured image containing the subject is rendered, whereas other portions of the image are not.

During a videoconference, one or more cameras (e.g., camera 118 and camera 120) capture video and provide the captured video to the video module 110 and codec 112 for processing. In at least one example of this disclosure, one camera (e.g., 118) is a smart camera and one camera (e.g., 120) is not a smart camera. In some examples, two or more cameras (e.g., camera 118 and camera 120) are cascaded such that one camera controls some or all operations of the other camera. In some examples, two or more cameras (e.g., camera 118 and camera 120) are cascaded such that data captured by one camera is used (e.g., by control module 114) to control some or all operations of the other camera. Additionally, one or more microphones 122 capture audio and provide the audio to the audio module 106 and codec 108 for processing. These microphones 122 can be table or ceiling microphones, or they can be part of a microphone pod or the like. In one or more examples, the microphones 122 are tightly coupled with one or more cameras (e.g., camera 118 and camera 120). The endpoint 100 uses the audio captured with these microphones 122 primarily for the conference audio.

As shown in FIG. 1, an endpoint 100 also includes microphone array 124, in which subarray 126 is orthogonally arranged with subarray 128. Microphone array 124 also captures audio and provides the audio to the audio module 22 for processing. In some examples, microphone array 124 includes both vertically and horizontally arranged microphones for determining locations of audio sources, e.g., people who are speaking. In some examples, microphone array 124 includes only horizontally arranged microphones. In some examples, the endpoint 100 uses audio from the array 124 primarily for camera tracking purposes and not for conference audio. In some examples, endpoint 100 uses audio from the array 124 for both camera tracking and conference audio.

After capturing audio and video, the endpoint 100 encodes the audio and video in accordance with an encoding standard, such as MPEG-1, MPEG-2, MPEG-4, H.261, H.263 and H.264. Then, the network module 116 outputs the encoded audio and video to the remote endpoints 102 via the network 104 using an appropriate protocol. Similarly, the network module 116 receives conference audio and video through the network 104 from the remote endpoints 102 and transmits the received audio and video to their respective codecs 108/112 for processing. Endpoint 100 also includes a loudspeaker 130 which outputs conference audio, and a display 132 outputs conference video.

In at least one example of this disclosure, the endpoint 100 uses the two or more cameras 118, 120 in an automated and coordinated manner to handle video and views of the videoconference environment dynamically. In some examples, a first camera (e.g. 118) is a fixed or room-view camera, and a second camera 120 is a controlled or people-view camera. Using the room-view camera (e.g. 118), the endpoint 100 captures video of the room or at least a wide or zoomed-out view of the room that would typically include all the videoconference participants 121 as well as some of their surroundings.

According to some examples, the endpoint 100 uses the people-view camera (e.g., 120) to capture video of one or more participants, including one or more current talkers, in a tight or zoomed-in view. In at least one example, the people-view camera (e.g., 120) can pan, tilt and/or zoom.

In one arrangement, the people-view camera (e.g., 120) is a steerable pan-tilt-zoom (PTZ) camera, while the room-view camera (e.g., 118) is an electronic pan-tilt-zoom (EPTZ) camera. As such, the people-view camera (e.g., 120) can be steered, while the room-view camera (e.g., 118) cannot. In at least one example, both camera 118 and camera 120 are EPTZ cameras. In at least one example, camera 118 is associated with a sound source locator module 134. In fact, both cameras 118, 120 can be steerable PTZ cameras.

In some examples, the endpoint 100 will alternate between tight views of a speaker and wide views of a room. In some examples, the endpoint 100 alternates between two different tight views of the same or different speaker. In some examples, the endpoint 100 will capture a first view of a person with one camera and a second view of the same person with another camera and determine which view is better for sharing with a remote endpoint 102.

In at least one example of this disclosure, the endpoint 100 outputs video from only one of the two cameras 118, 120 at any given time. As the videoconference proceeds, the output video from the endpoint 100 can switch from the view of one camera to another. In accordance with some examples, the system 100 outputs a room-view when there is no participant speaking a people-view when one or more participants 121 are speaking.

In accordance with an example, the endpoint 100 can transmit video from both cameras 118, 120 simultaneously, and the endpoint 100 can let the remote endpoint 102 decide which view to display, or determine that one view will be displayed relative the other view in a specific manner. For example, one view can be composited as a picture-in-picture of the other view.

In one or more examples, the endpoint 100 uses audio-based locator 134 and a video-based locator 136 to determine locations of participants 121 and frame views of the environment and participants 121. The control module 114 uses audio and/or video information from these locators 134, 136 to crop one or more captured views, such that one or more subsections of a captured view will be displayed on a display 132 and/or transmitted to a remote endpoint 102. In some examples, commands to one or both cameras 118, 120 are implemented by an actuator or local control unit 138 having motors, servos, and the like to steer one or both cameras 118, 120 mechanically. In some examples, such camera commands can be implemented as electronic signals by one or both cameras 118, 120.

In some examples, to determine which camera's view to use and how to configure a view, the control module 114 uses audio information obtained from the audio-based locator 134 and/or video information obtained from the video-based locator 136. For example, the control module 114 uses audio information processed by the audio-based locator 134 from the horizontally and vertically arranged microphone subarrays 126, 128. The audio-based locator 134 uses a speech detector 138 to detect speech in captured audio from subarrays 126, 128 to determine a location of a current participant. The control module 114 uses the determined location to steer the people-view camera toward that location. In some examples, the control module 114 uses video information captured using the cameras 118, 120 and processed by the video-based locator 136 to determine the locations of participants 121, to determine the framing for the views, and to steer the one or more of the cameras (e.g., 118, 120). In other examples, none of the cameras is physically steerable.

A wide view from one camera (e.g., 118) can give context to a zoomed view from another camera (e.g., 120) so that participants 121 at the far-end 102 see video from one camera (e.g., 118) as the video from the other camera (e.g., 120) is being adjusted. In some examples, transitions between the two views from the cameras 118, 120 can be faded and blended to avoid sharp cut-a-ways when switching between camera views. In some examples, a switch from a first view to a second view for transmission to a remote endpoint 102 will not occur until an active participant 121 has been present in the second view for a minimum amount of time. In at least one example of this disclosure, the minimum amount of time is one second. In at least one example, the minimum amount of time is two seconds. In at least one example, the minimum amount of time is three seconds. In at least one example, the minimum amount of time is four seconds. In at least one example, the minimum amount of time is five seconds. In other examples, other minima (e.g., 0.5-7.0 seconds) are used, depending on such factors as the size of a conference room, the number of participants 121 at an endpoint 100, the cultural niceties of the participants 140 at the remote endpoint 102, and the sizes of one or more displays 132 displaying captured views.

Figure 2:
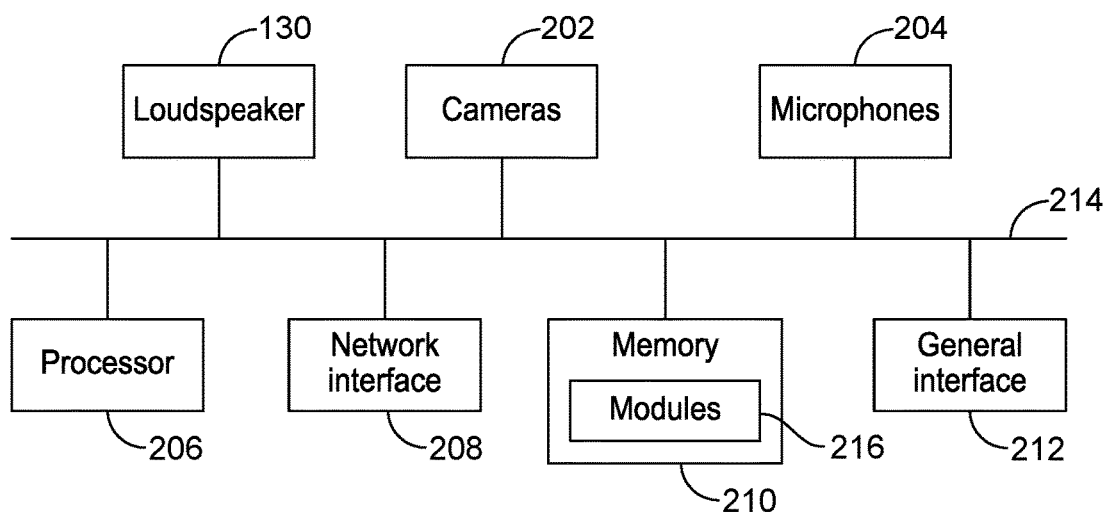
FIG. 2 illustrates aspects of the videoconferencing endpoint of FIG. 1.

FIG. 2 illustrates aspects of videoconferencing endpoint 200 (e.g., 100), in accordance with an example of this disclosure. The endpoint 200 includes a loudspeaker 130, cameras 202 (e.g., 118, 120) and microphones 204 (e.g., 122, 124). The endpoint 200 also includes a processing unit 206, a network interface 208, a memory 210 and an input/output interface 212, all coupled by bus 101.

The memory 104 can be any conventional memory such as SDRAM and can store modules 216 in the form of software and firmware for controlling the endpoint 200. In addition to audio and video codecs (108, 112) and other modules discussed previously, the modules 216 can include operating systems, a graphical user interface (GUI) that enables users to control the endpoint 200, and algorithms for processing audio/video signals and controlling the cameras 202. In at least one example of this disclosure, one or more of the cameras 202 can be a panoramic camera.

The network interface 208 enables communications between the endpoint 200 and remote endpoints (102). In one or more examples, the interface 212 provides data transmission with local devices such as a keyboard, mouse, printer, overhead projector, display, external loudspeakers, additional cameras, and microphone pods, etc.

The cameras 202 and the microphones 204 capture video and audio, respectively, in the videoconference environment and produce video and audio signals transmitted through the bus 214 to the processing unit 206. In at least one example of this disclosure, the processing unit 206 processes the video and audio using algorithms in the modules 216. For example, the endpoint 200 processes the audio captured by the microphones 204 as well as the video captured by the cameras 202 to determine the location of participants 121 and control and select from the views of the cameras 202. Processed audio and video can be sent to remote devices coupled to network interface 208 and devices coupled to general interface 212.

Figure 3:
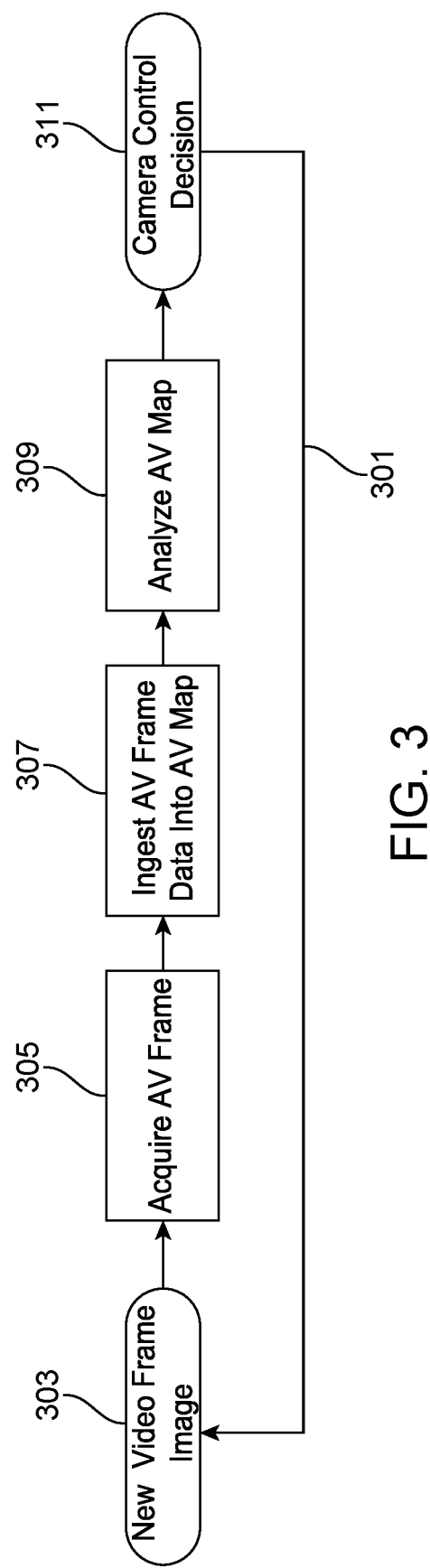
FIG. 3 illustrates a method for building contextual data for an audio-visual map, in accordance with an example of this disclosure.

FIG. 3 illustrates a method 300 for building contextual data for an audio-visual map, in accordance with an example of this disclosure. The method 300 of building data contained in an audio-visual map is an iterative process 301 in which framing affects camera control decisions and camera decisions affect further framing. The duration of process 301 is not fixed. The length of time to perform the method 300 depend on factors such as the speed of the processor(s) executing the process 301, the rapidity with which equipment can capture data, and the complexity of data so captured. In at least one example of this disclosure, the duration of time for the process 301 corresponds to a video frame rate (VFR). The VFR is an amount of time required to acquire, process, and analyze one frame of audio-visual data.

In some examples, the VFR is actively tracked by the system (e.g., 100, 200) so that the system can adjust internal values and calculations accordingly. In at least one example of this disclosure, the VFR is four hundred milliseconds. In some examples, the VFR is three seconds. The method 300 begins with the capture 303 of a still image (of a stream of images). An audio-visual frame is acquired 305 which contains both audio-visual data corresponding to the instant in time during which the still image was captured 303. This data of the audio-visual frame is ingested 307 into an audio-visual map. The AV map is analyzed 309, and one or more camera control decisions are made 311 based on the analysis 309.

Figures 4, 5:
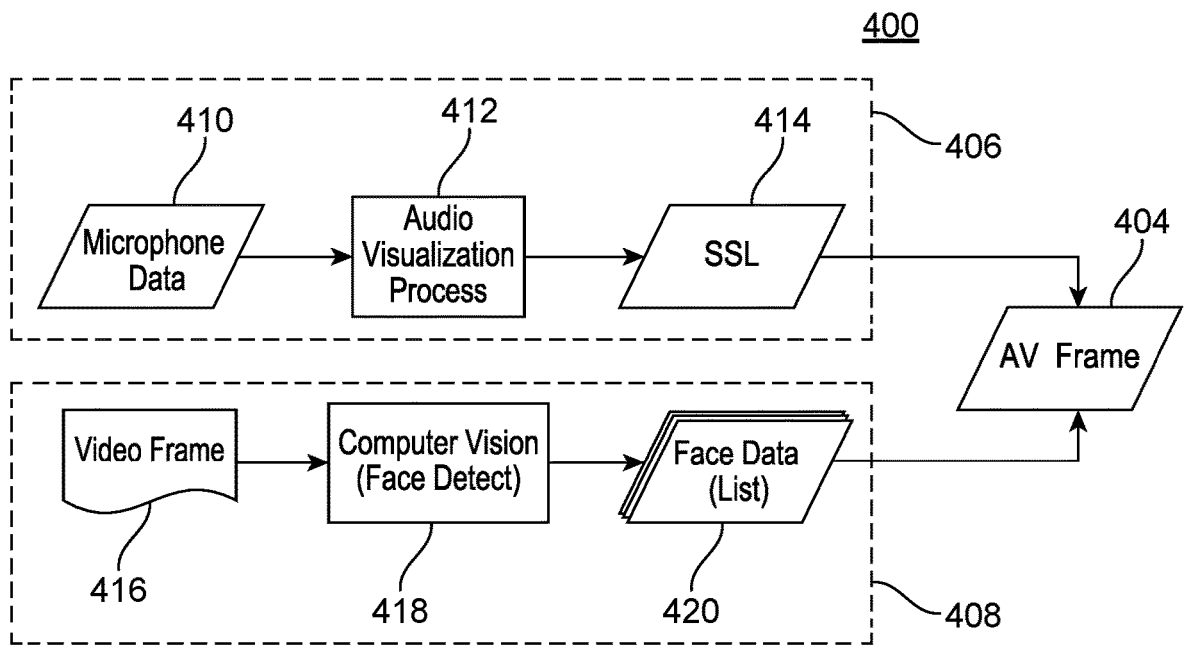
FIG. 4 illustrates a method of acquiring an audio-visual frame, in accordance with an example of this disclosure.
FIG. 5 illustrates an audio-visual frame, in accordance with an example of this disclosure.

FIG. 4 illustrates a method 400 of acquiring an audio-visual frame 404, in accordance with an example of this disclosure. The method 400 has an audio component 406 and a video component 408. As noted, at the beginning of the method 300 for building contextual data for an audio-visual map, a video frame 416 has been captured as a still image. Concurrently, the system (e.g., 100, 200) monitors audio data 410 from the system microphones corresponding to the still image. An audio visualization process 412 generates a single value indicating an area of active speech or sound source location (SSL) 414. Simultaneously, the (still) video image is analyzed 418 using one or more algorithms to detect faces, such as a computer vision algorithm. Data from both processes 406, 408 are combined to produce the resulting audio-visual frame 404.

FIG. 5 illustrates an audio-visual frame 500, in accordance with an example of this disclosure. An audio-visual frame 404 can include face data 503, corresponding to a list of classified faces. Face data 505, 507 for an individual's face (e.g., Jeremy, Melissa) can include location data corresponding to a region in an image bounding a face. Face data 505, 507 can also include landmark data, which can include coordinates corresponding the location features such as eyes, nose, mouth. In some examples, the locations of such features as heads, bodies, and torso are tracked. audio-visual frame 500 also includes SSL information 509. SSL information can include a horizontal direction from which a sound is being emitted, such as from a person talking. In some examples, if the SSL has a value of −1 that indicates that no sound is currently being detected.

FIG. 6 illustrates a method 600 of ingesting an audio-visual frame 500 into an audio-visual map (see 700, FIG. 7). Within an audio-visual map, face data is represented as a dynamic list of target objects. Each face in an incoming frame is compared to the data from each target object stored in the list. If the region containing the facial data is within a certain distance of a known target object, the subject corresponding to the facial data is considered to be the same subject (e.g., a person has moved his head) and the data in the dynamic list of targets is updated accordingly.

According to the method 600, each target object has location data and contextual event data referred to as weights. (See discussion of object-oriented programming above.) Weights reflect a frequency of occurrence of attributes which are tracked over time. Weights can be incremented or decremented during an iteration of the method 600. In at least one example of this disclosure, weight characteristics are defined using various parameter values. Parameter values help determine the system (e.g., 100, 200) determine the relevance of information which is currently being ingested 600 by providing context to the data of an incoming audio-visual frame.

In accordance with one or more examples of this disclosure, parameter values include: an Initial Value ($V_{Init}$), which is the value that the weight will be set to when an first event occurs, (e.g., a face is detected); a Threshold (T), which is the value when the event being tracked is considered valid; a Max Value ($V_{Max}$), which is the the maximum value that a weight can have; an Increment Value ($V_{Inc}$), which is the amount a weight is increased for each occurrence of a given event; a Decrement Value ($V_{Dec}$), which is the amount a weight is reduced when an event in question does not occur; and a Floor Value ($V_{Floor}$), which is the minimum value to which a weight may be reduced. In some examples of this disclosure, attributes have default values which can be dynamically changed at runtime to induce different performance characteristics or maintain desired performance characteristics. In some examples, parameter values include gaze angle, raised hands, and/or hand position.

In accordance with one or more examples of this disclosure, when tracking a teleconference, data tracked with weights includes a Face Weight ($W_F$), which is an indicator of how likely it is that a face is present; a Talker Weight ($W_T$), which is a measure of a how likely it is that a person is an active talker; a Conversation Weight ($W_C$), which is a measure of how likely it is that a target is participating in a conversation; and Gaze Weights (Left, Right, Center) ($W_{[L,R,C]}$), which use landmark (eyes, nose, mouth) locations to measure a target's gaze relative to a camera.

In accordance with method 600, thresholds are used to evaluate the confidence of the attributes being tracked. Weight values are compared to thresholds to determine the relevance of the attribute corresponding to the weight in question. In accordance with one or more examples of this disclosure, thresholds include a Face Threshold ($T_F$), which is a value at which the system (e.g., 100, 200) will consider a target as being valid (to be included in a decision algorithm rather than to be ignored); a Talker Threshold ($T_T$), which is a value at which a target has been speaking long enough to garner attention; a Conversation Threshold ($T_C$), which is a value used to determine how dominant a target is within a conversation; and a Gaze Threshold ($T_{G[L,R,C]}$), which is a value used to determine that a target has been looking in a certain direction for a 'significant' period.

In some examples of this disclosure, in addition to the weight data tracked for individual objects discussed, weights and thresholds for more global attributes may be applied. In at least one example, a Silence Weight ($W_S$) and a Silence Threshold ($T_S$) can be tracked for individual targets but used to evaluate room silence, such as when no active conversation can be detected. In at least one example of this disclosure, weights are updated using prescribed parameter values according to the application logic shown in Table 1 below.

TABLE 1

```
if( initialCondition == true) {
    W = V_Init
} else if(attributeCondition == true) {
    W = W + V_Inc
    if(W > V_Max) {
        W = V_Max
    }
) else {
    W = W - V_Dec
    If(W < V_Floor) {
        W = V_Floor
    }
}
```

As shown in FIG. 6, an audio-visual frame 500 is received by the system (e.g., 100, 200). The audio-visual frame 500 consists of face data 503 and sound data 509. The face data 503 and sound data 509 are normally captured concurrently or very nearly concurrently. According to the method 600, a determination 606 is made as to whether each face in the face data corresponds to a face which is already present in an audio-visual map. Face data for known targets is updated 608, and data for new faces is added 610, thereby producing 612 a current target data set. For a given target, a determination 614 is made as to whether that target is present in the incoming audio-visual frame 500. If the target target is present in the incoming audio-visual frame 500, Silence Weight ($W_S$) is incremented 618. If the target is not present in the incoming audio-visual frame 500, Silence Weight ($W_S$) is decremented 620. A determination 622 is then made as to whether the Silence Weight ($W_S$) is zero. If the Silence Weight ($W_S$) for the target is zero, the target will be removed 624 from the list of targets in the audio-visual map (e.g. 700, 822). The sound data 509 is evaluated 616 with respect to the targets in the updated targets list of the audio-visual map. If the sound is emanating from a source which is within a region bounding a target, then the Talker Weight ($W_T$) for the target is incremented 626. If the sound does not emanate from a source which is within the region bounding the target, then the Talker Weight ($W_T$) for the target is decremented 628. If no speech is detected 630 the Silence Weight ($W_S$) for the endpoint is incremented 632. If speech was detected, regardless of the location from which the speech emanates, the Silence Weight ($W_S$) for the endpoint is set 634 to zero.

In at least one example of this disclosure, the presence of sound corresponding to a target will preclude the Face Weight ($W_F$) from being decremented despite an absence of facial data in a target region.

FIG. 7 illustrates an audio-visual map 700, in accordance with an example of this disclosure. The audio-visual map 700 contains information 707 about Target A and information 709 about Target B, as discussed with respect to method 600 of FIG. 6. The audio-visual map 700 includes global information including the number of persons 711 present, the identity of any current talker, and any groups 715. The audio-visual map also contains current settings 717 for evaluating the weights, including a Talker Threshold ($T_T$) 719 and a Face Threshold ($T_F$) 721. In some examples of this disclosure such thresholds can be adjusted, either by human intervention, or through artificial intelligence, to suit the specifics of a teleconference endpoint (e.g., 100, 200).

Figure 8:
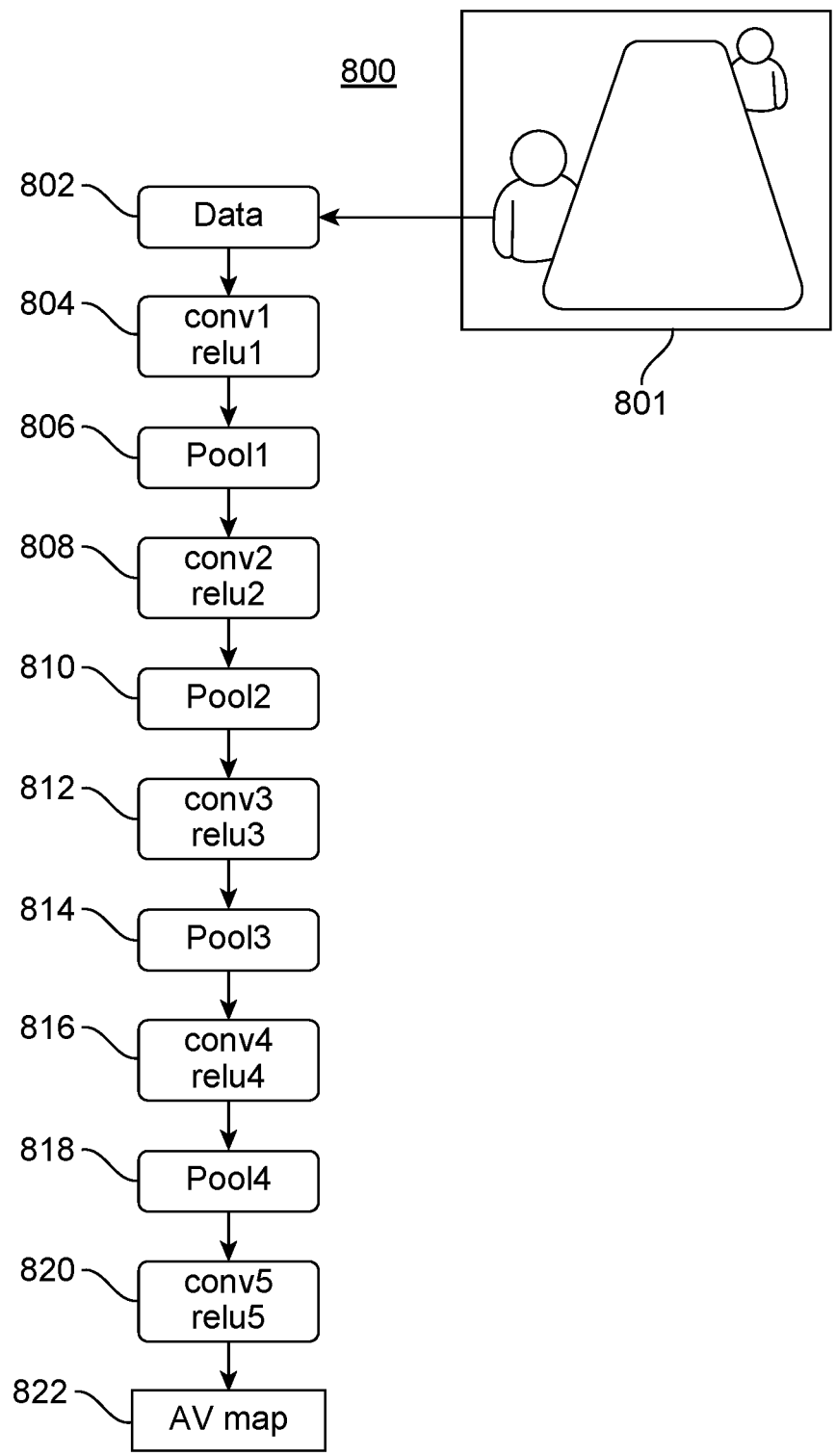
FIG. 8 illustrates a focus target estimation model, in accordance with an example of this disclosure.

FIG. 8 illustrates a focus target estimation model 800, in accordance with examples of this disclosure. As described with respect to FIG. 3 and FIG. 4, a video frame image 801 (e.g., 303, 416) is captured by a camera 202. The image data 802 corresponding to a frame of the view passes to a first convolutional layer 804 and a first rectified linear activation function is applied. The rectified output of the first convolutional layer then passes to a first pooling layer 806. The output of the first pooling layer 806 then passes to a second convolutional layer 808 and a second rectified linear activation function is applied. The rectified output of the second convolutional layer then passes to a second pooling layer 810. The output of the second pooling layer 810 then passes to a third convolutional layer 812 and a third rectified linear activation function is applied. The rectified output of the third convolutional layer 812 then passes to a third pooling layer 814. The output of the third pooling layer 814 then passes to a fourth convolutional layer 816 and a fourth rectified linear activation function is applied. The rectified output of the fourth convolutional layer 816 then passes to a fourth pooling layer 818. The output of the fourth pooling layer 818 then passes to a fifth convolutional layer 820 and a fifth rectified linear activation function is applied. The rectified output of the fifth convolutional layer 820 contains an audio-visual map 822. The audio-visual map 822 is used to help identify the targets of interest so that the targets of interest can be properly framed for rendering, such as inclusion in an audio-visual data stream. In some examples of this disclosure, the audio-visual map contains a probability distribution indicating how likely it is that participants do or will care about one or more areas corresponding to target regions. In some examples of this disclosure, the audio-visual map contains a target data which is indicative of the likelihood that participants do or will about one or more areas which correspond to target regions.

Figure 9:
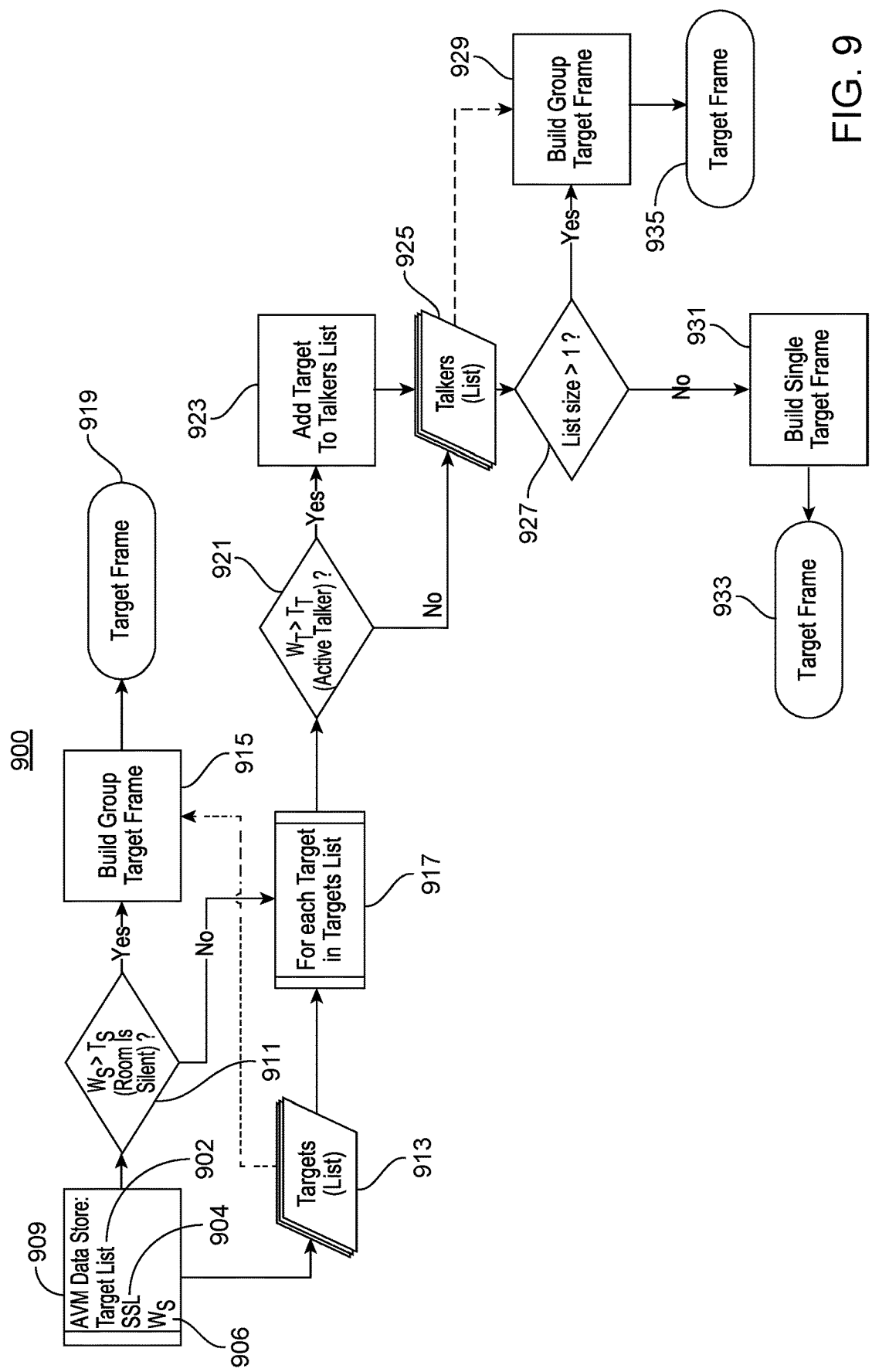
FIG. 9 illustrates a method of analyzing an audio-visual map, in accordance with an example of this disclosure.

FIG. 9 illustrates a method 900 of analyzing an audio-visual map 909 (e.g., 700), in accordance with an example of this disclosure. The method 900 begins with receipt of an audio-visual map 909 containing information such as a target list 902, sound source location data 904, and Silence Weight ($W_S$) 906. The targets list is extracted 913. The Silence Weight ($W_S$) is compared 911 to the Silence Threshold ($T_S$). If the Silence Weight ($W_S$) exceeds the Silence Threshold ($T_S$), a target frame containing the targets of the targets list 902 is composed, and that composed frame can be rendered 919 accordingly. If the Silence Weight ($W_S$) does not exceed the Silence Threshold ($T_S$), then each target is evaluated 917 for being a possible active talker. If the Talker Weight ($W_T$) for a target exceeds a Talker Threshold ($T_T$), that person is added 923 to a list of active talkers. If the Talker Weight ($W_T$) for the target does not exceed the Talker Threshold ($T_T$), that person is not added 923 to the list of active talkers. In either case, the list of talkers is evaluated 925. If the there is more than one active talker a group frame containing all active talkers can be constructed 929, and the constructed frame rendered. Alternatively, if only one person is speaking, a target frame containing just the speaking person can be built 931, and a sub-frame depicting the active talker will be rendered. Thus, the input of method 900 is an audio-visual map (data store) 909, and the output of the method 900 is a target frame which is a bounding box (x,y coordinates) within a video frame that the camera should include in a data stream in order to show the proper targets.

In some examples of this disclosure, once the audio-visual Frame has been ingested, the entire audio-visual map can be evaluated to determine the desired control functionality. The data can be read into a simple logic algorithm or taken as input to a Neural Network or Deep Learning algorithm to achieve a variety of different experiences such as: Speaker Framing, in which a single talker is framed; Group Framing, in which images of all participants in a camera's field of view are included in a data stream; Conversation Tracking, in which participants involved in a conversation are shown in a wide-angle view or a split-screen view; Subject Framing, in which a target that most participants appear to be looking towards is framed; and Presenter Tracking, in which a specific target is selected to be followed and included in a data stream.

In at least one example of this disclosure, data captured by an audio-visual map is used to infer various meeting contexts. Face locations and relative weights along with the sound source data can be input into a sub-system that can influence functionality. For example, if someone is speaking (within the field of view) but not seen by the audio-visual system (e.g., 100, 200), the area corresponding to the sound source location can be included in the auto-framing scheme. Whether people are moving (e.g., walking in or out of a room) or seated can drive the decision on whether to zoom in on an area or choose a wide angle.

Figure 10:
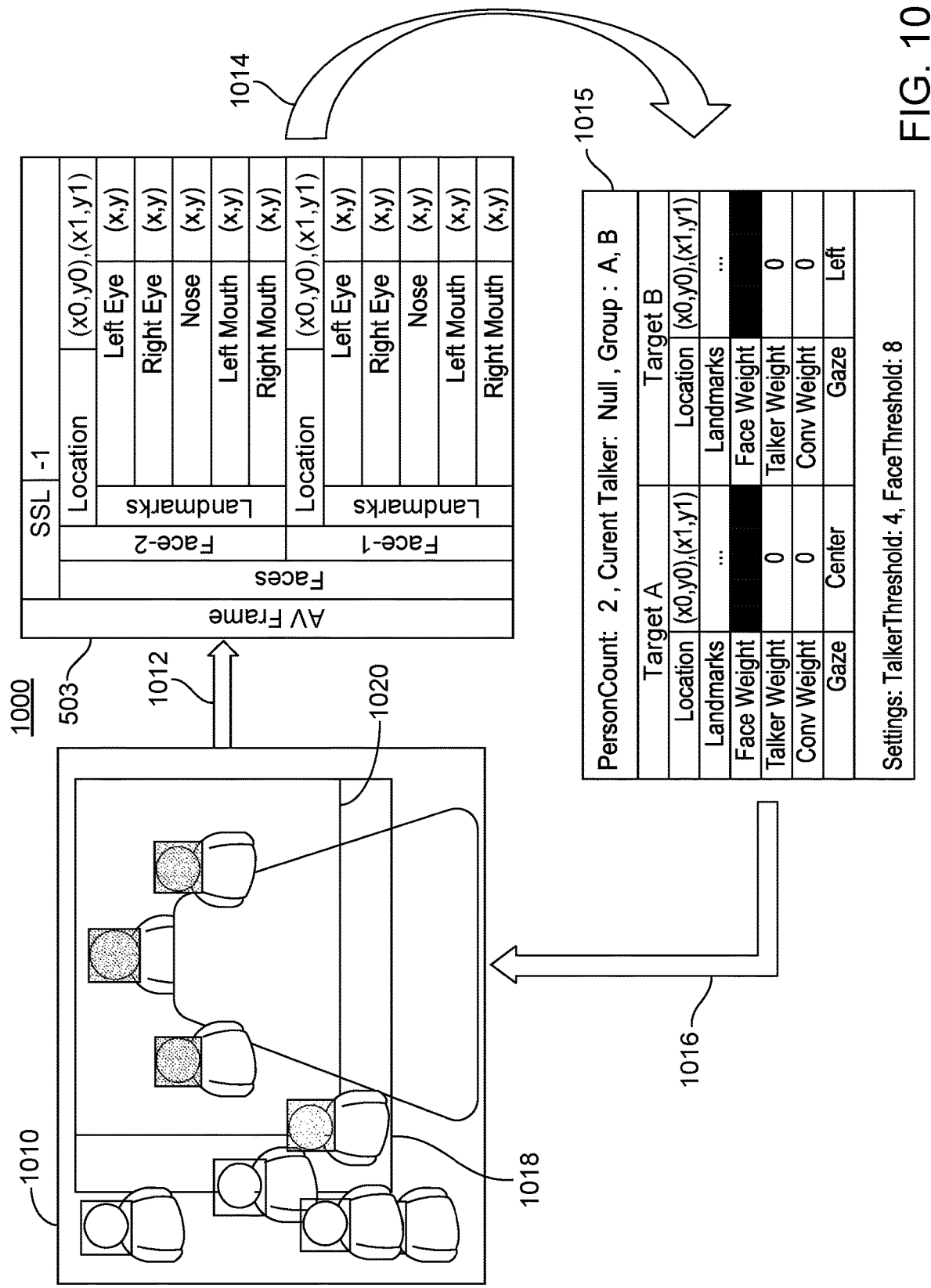
FIG. 10 illustrates an audio-visual map process cycle, in accordance with an example of this disclosure.

FIG. 10 illustrates an audio-visual frame and audio-visual map process cycle 1000, in accordance with an example of this disclosure. A frame 1010 is captured, and information of that frame 1010 is organized 1012 into an audio-visual frame 503. The audio-visual frame 503 is ingested 1014 into the audio-visual map 1015 (e.g., 700, 822). And based on the audio-visual map 1015, a first sub-frame 1018 can be selected and/or a second sub-frame 1020 can be selected for rendering.

Figure 11:
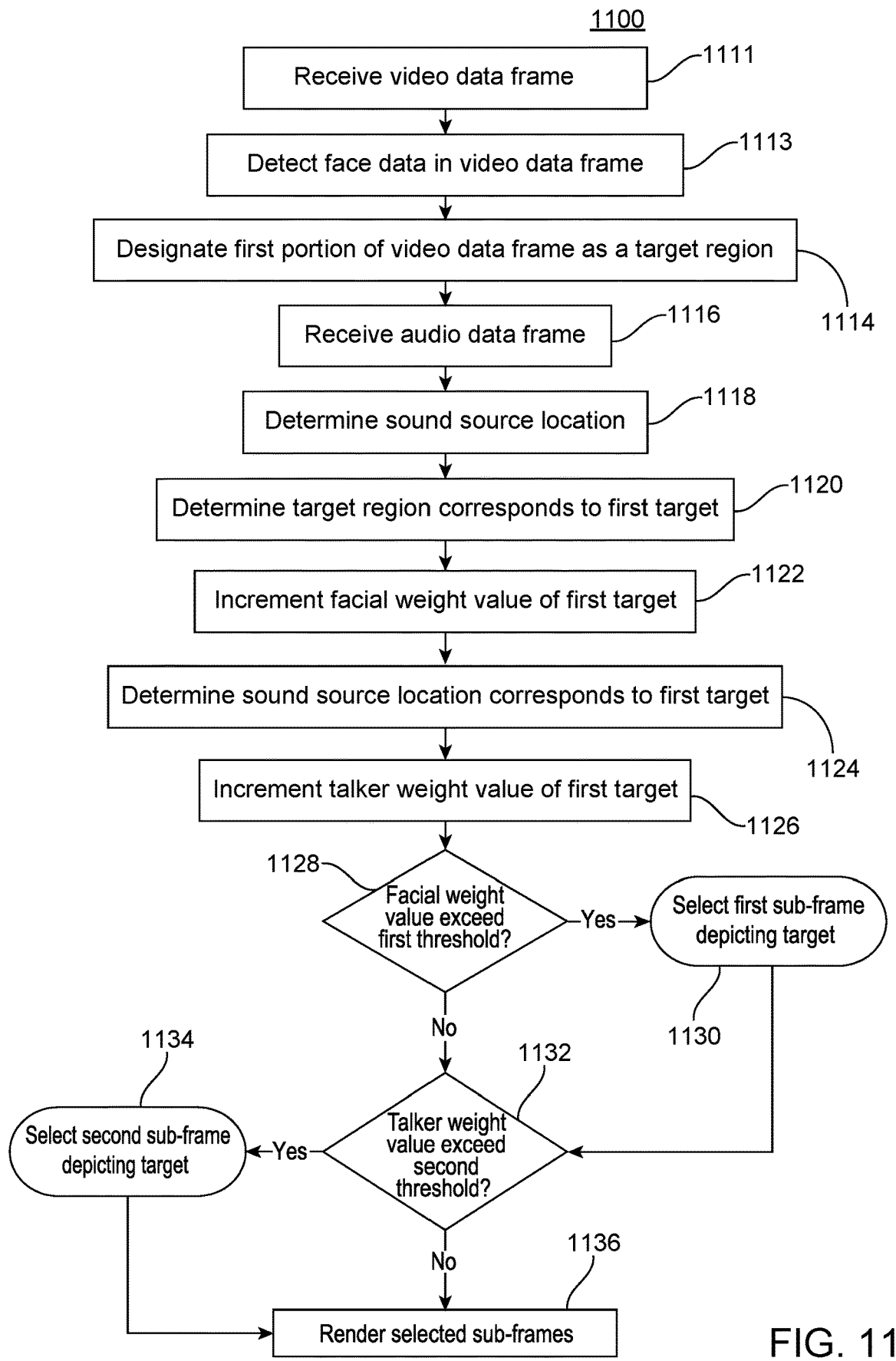
FIG. 11 illustrates a method of selecting sub-frames of video information for rendering in a teleconferencing system, in accordance with an example of this disclosure.

FIG. 11 illustrates a method 1100 of selecting sub-frames of video information for rendering in a teleconferencing system (e.g., 100, 200), in accordance with an example of this disclosure. The method 1100 begins with receiving 1111, from a camera device, a video data frame. Thereafter; the presence of data indicative of a face is detected 1113 within the video data frame. A portion of the of the video data frame is then designated 1114 as a target region based on the data indicative of the face. The method 1100 then proceeds to step 1116, which includes receiving, from a microphone device, an audio data frame. In at least one example, the audio data frame is associated in time with the video data frame. Thereafter, the method 1100 will use the audio data frame to locate 1118 the source of the detected sound. The audio-visual map can then be updated. The audio-visual map corresponds to a plurality of earlier video data frames and related audio data frames. The method 1100 proceeds with determining 1120 that the target region corresponds to a target of the audio-visual map. The target can correspond to a meeting participant. Based on the determination 1120, a facial weight value of the target is incremented 1122. In step 1124, a determination 1124 is made that the sound source location corresponds to the target. Based on the determination 1124, a talker weight value of the target if incremented 1126. The method 1100 proceeds to select one or more sub-frames of the video data frame by determining 1128 whether the facial weight value exceeds a predetermined threshold. If the facial weight value exceeds the predetermined threshold, indicating that the target region contains a face, a first sub-frame depicting the target is selected. The first sub-frame can correspond to a sub-portion of a room view captured by room view camera. Regardless of whether the facial weight value threshold is exceeded, a determination 1132 is made as to whether a talker weight value for the target exceeds a predetermined threshold. This makes sense when one considers that although at a specific instant facial data may not be present, (extremely recent) historical data indicates a person is present in the target region in question. When talker weight value for the target exceeds the second threshold, the talker will be included in a second sub-frame of the audio-visual frame. One or more selected subframes are then rendered 1136. In at least one example, rendering comprises including the first sub-frame and the second sub-frame in an audio-video stream for transmission to a remote endpoint.

Figure 12:
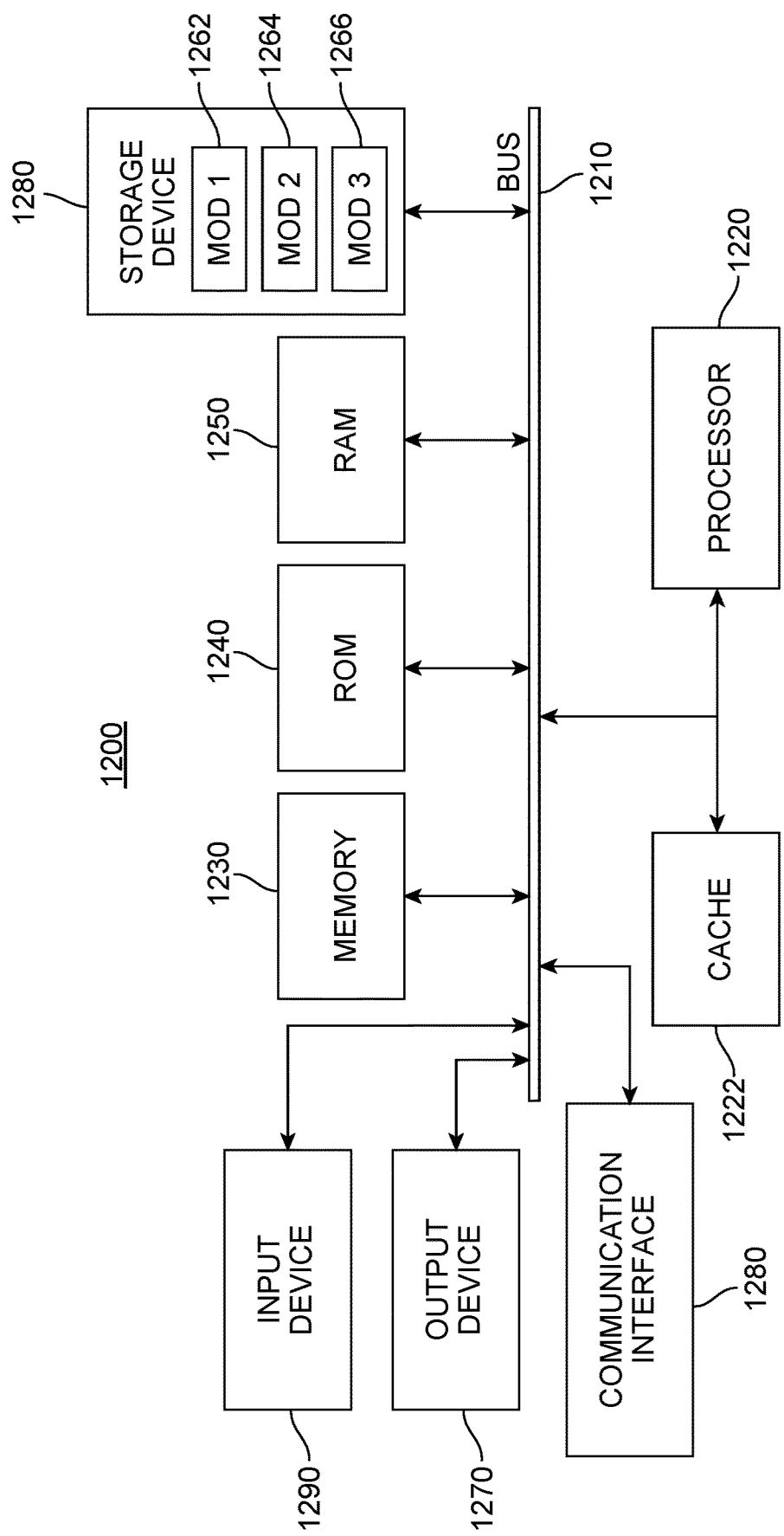
FIG. 12 illustrates a communication device configured to practice the concepts and methods of this disclosure.

FIG. 12 illustrates a communication device 1200 (e.g., 100, 200) which can be employed to practice the concepts and methods described. The components disclosed described can be incorporated in whole or in part into tablet computers, personal computers, handsets and other devices utilizing one or more microphones. As shown, device 1200 can include a processing unit (CPU or processor) 1220 (e.g., 206) and a system bus 1210. System bus 1210 interconnects various system components—including the system memory 1230 such as read only memory (ROM) 1240 and random-access memory (RAM) 1250—to the processor 1220. The processor 1220 can comprise one or more digital signal processors. The device 1200 can include a cache 1222 of high-speed memory connected directly with, near, or integrated as part of the processor 1220. The device 1200 copies data from the memory 1230 and/or the storage device 1260 to the cache 1222 for quick access by the processor 1220. In this way, the cache provides a performance boost that avoids processor 1220 delays while waiting for data. These and other modules can control or be configured to control the processor 1220 to perform various actions. Other system memory 1230 may be available for use as well. The memory 1230 can include multiple different types of memory with different performance characteristics. The processor 1220 can include any general-purpose processor and a hardware module or software module, such as module 1 (1262), module 2 (1264), and module 3 (1266) stored in storage device 1260, configured to control the processor 1220 as well as a special-purpose processor where software instructions are incorporated into the actual processor design. The processor 1220 may essentially be a completely self-contained computing system, containing multiple cores or processors, a bus, memory controller, cache, etc. A multi-core processor may be symmetric or asymmetric.

The system bus 1210 may be any of several types of bus structures including a memory bus or memory controller, a peripheral bus, and a local bus using any of a variety of bus architectures. A basic input/output system (BIOS) stored in ROM 1240 or the like, may provide the basic routine that helps to transfer information between elements within the device 1200, such as during start-up. The device 1200 further includes storage devices 1260 such as a hard disk drive, a magnetic disk drive, an optical disk drive, tape drive or the like. The storage device 1260 can include software modules 1262, 1264, 1266 for controlling the processor 1220. Other hardware or software modules are contemplated. The storage device 1260 is connected to the system bus 1210 by a drive interface. The drives and the associated computer readable storage media provide nonvolatile storage of computer readable instructions, data structures, program modules and other data for the device 1200. In at least one example, a hardware module that performs a function includes the software component stored in a non-transitory computer-readable medium coupled to the hardware components—such as the processor 1220, bus 1210, output device 1270, and so forth—necessary to carry out the function.

For clarity of explanation, the device of FIG. 12 is presented as including individual functional blocks including functional blocks labeled as a "processor." The functions these blocks represent may be provided using either shared or dedicated hardware, including, but not limited to, hardware capable of executing software and hardware, such as a processor 1220, that is purpose-built to operate as an equivalent to software executing on a general-purpose processor. For example, the functions of one or more processors presented in FIG. 12 can be provided by a single shared processor or multiple processors. One or more examples of this disclosure include microprocessor hardware, and/or digital signal processor (DSP) hardware, read-only memory (ROM) 1240 for storing software performing the operations discussed in one or more examples below, and random-access memory (RAM) 1250 for storing results. Very large-scale integration (VLSI) hardware embodiments, as well as custom VLSI circuitry in combination with a general-purpose DSP circuit (1233, 1235), can also be used.

ENUMERATED EXAMPLES

Examples of this disclosure also include:

1. A method of selecting sub-frames of video information for rendering in a teleconferencing system, comprising: receiving, from a camera device, a video data frame; detecting a presence, within the video data frame, of data indicative of a face; designating a portion of the video data frame as a target region based on the data indicative of the face; receiving, from a microphone device, an audio data frame, the audio data frame associated in time with the video data frame, the audio data frame indicative of a sound source location; updating an audio-visual map, the audio-visual map corresponding to a plurality of earlier video data frames and audio data frames associated therewith, wherein updating the audio-visual map comprises: determining that the target region corresponds to a first target of the audio-visual map, the first target corresponding to a meeting participant, incrementing a facial weight value of the first target, responsive to determining that the target region corresponds to the first target, determining that the sound source location corresponds to the first target, and incrementing a first talker weight value of the first target, responsive to determining that the sound source location corresponds to the first target; selecting one or more sub-frames of the video data frame, wherein selecting one or more subframes comprises: selecting a first sub-frame depicting the first target when the facial weight value exceeds a first threshold, and selecting a second sub-frame depicting the first target when the first talker weight value exceeds a second threshold; and including the first sub-frame and the second sub-frame in an audio-video stream for transmission to a remote endpoint.

2. The method of example 1, wherein the first sub-frame and the second sub-frame are different.

3. The method of example 1, wherein the first sub-frame encompasses the second sub-frame.

4. The method of example 1, wherein: updating the audio-visual map further comprises decrementing a second talker weight value of a second target of the audio-visual map, the second target corresponding to a second participant, responsive to determining that the sound source location corresponds to the first target; and selecting the first sub-frame comprises selecting the first sub-frame to include a depiction of the second target.

5. The method of example 4, wherein selecting the second sub-frame comprises selecting the second sub-frame to exclude the depiction of the second target.

6. The method of example 1, further comprising generating the audio-visual map using a convolutional neural network.

7. The method of example 1, further comprising: comparing the first talker weight value of the first target to a second talker weight value of a second target of the audio-visual map, the second target corresponding to a second participant; and incrementing a first conversational weight value of the first target and a second conversational weight of value the second target when the first talker weight value of the first target and second talker weight value of the second target each exceed a third threshold and an absolute value of a difference between the first talker weight value of the first target and the second talker weight value of the second target does not exceed a fourth threshold, wherein selecting one or more sub-frames further comprises selecting a third sub-frame depicting the first target and the second target when the first conversational weight value of the first target and the second conversational weight of value the second target each exceed a fifth threshold.

8. A non-transitory computer readable medium storing instructions executable by a processor, wherein the instructions comprise instructions to: receive, from a camera device, a video data frame; detect a presence, within the video data frame, of data indicative of a face; designate a portion of the video data frame as a target region based on the data indicative of the face; receive, from a microphone device, an audio data frame, the audio data frame associated in time with the video data frame, the audio data frame indicative of a sound source location; update an audio-visual map, the audio-visual map corresponding to a plurality of earlier video data frames and audio data frames associated therewith, wherein the instructions to update the audio-visual map comprise instructions to: determine that the target region corresponds to a first target of the audio-visual map, the first target corresponding to a meeting participant, increment a facial weight value of the first target, responsive to determining that the target region corresponds to the first target, determine that the sound source location corresponds to the first target, and increment a first talker weight value of the first target, responsive to determining that the sound source location corresponds to the first target; select one or more sub-frames of the video data frame, wherein the instructions to select one or more subframes comprise instructions to: select a first sub-frame depicting the first target when the facial weight value exceeds a first threshold, and select a second sub-frame depicting the first target when the first talker weight value exceeds a second threshold; and render, one or more selected sub-frames using at least one display device.

9. The non-transitory computer readable medium of example 8, wherein the first sub-frame and the second sub-frame are different.

10. The non-transitory computer readable medium of example 8, wherein the first sub-frame and the second sub-frame partially intersect.

11. The non-transitory computer readable medium of example 8, wherein: the instructions to update the audio-visual map further comprise instructions to decrement a second talker weight value of a second target of the audio-visual map, the second target corresponding to a second participant, responsive to determining that the sound source location corresponds to the first target; and the instructions to select the first sub-frame comprise instructions to select the first sub-frame to include a depiction of the second target.

12. The non-transitory computer readable medium of example 11, wherein the instructions to select the second sub-frame comprise instructions to select the second sub-frame to exclude the depiction of the second target.

13. The non-transitory computer readable medium of example 8, wherein the instructions further comprise a neural network in which the facial weight value and the first talker weight value each apply to one or more nodes.

14. The non-transitory computer readable medium of example 8, wherein the instructions further comprise instructions to: compare the first talker weight value of the first target to a second talker weight value of a second target of the audio-visual map, the second target corresponding to a second participant; and increment a first conversational weight value of the first target and a second conversational weight value of the second target when the first talker weight value of the first target and second talker weight value of the second target each exceed a third threshold and an absolute value of a difference between the first talker weight value of the first target and the second talker weight value of the second target does not exceed a fourth threshold, and wherein the instructions to select one or more sub-frames further comprise instructions to select a third sub-frame depicting the first target and the second target when the first conversational weight value of the first target and the second conversational weight value of the second target each exceed a fifth threshold.

15. A teleconferencing endpoint, comprising: a network interface; a camera device; a microphone device; a processor, the processor coupled to the network interface, the camera device and the microphone device; a memory, the memory storing instructions executable by the processor, wherein the instructions comprise instructions to: receive, from the camera device, a video data frame; detect a presence, within the video data frame, of data indicative of a face; designate a portion of the video data frame as a target region based on the data indicative of the face; receive, from the microphone device, an audio data frame, the audio data frame associated in time with the video data frame, the audio data frame indicative of a sound source location; update an audio-visual map, the audio-visual map corresponding to a plurality of earlier video data frames and audio data frames associated therewith, wherein the instructions to update the audio-visual map comprise instructions to: determine that the target region corresponds to a first target of the audio-visual map, the first target corresponding to a meeting participant, increment a facial weight value of the first target, responsive to determining that the target region corresponds to the first target, determine that the sound source location corresponds to the first target, and increment a first talker weight value of the first target, responsive to determining that the sound source location corresponds to the first target; select one or more sub-frames of the video data frame, wherein the instructions to select one or more subframes comprise instructions to: select a first sub-frame depicting the first target when the facial weight value exceeds a first threshold, and select a second sub-frame depicting the first target when the first talker weight value exceeds a second threshold; and transmit an audio-video stream containing the first sub-frame and the second sub-frame to a remote endpoint using the network interface.

16. The teleconferencing endpoint of example 15, wherein the first sub-frame and the second sub-frame are different.

17. The teleconferencing endpoint of example 15, wherein the first sub-frame and the second sub-frame partially intersect.

18. The teleconferencing endpoint of example 15, wherein: the instructions to update the audio-visual map further comprise instructions to decrement a second talker weight value of a second target of the audio-visual map, the second target corresponding to a second participant, responsive to determining that the sound source location corresponds to the first target; and the instructions to select the first sub-frame comprise instructions to select the first sub-frame to include a depiction of the second target.

19. The teleconferencing endpoint of example 18, wherein the instructions to select the second sub-frame comprise instructions to select the second sub-frame to exclude the depiction of the second target.

20. The teleconferencing endpoint of example 15, wherein the instructions further comprise a neural network in which the facial weight value and the first talker weight value each apply to one or more nodes.

21. The teleconferencing endpoint of example 15, wherein the instructions further comprise instructions to: compare the first talker weight value of the first target to a second talker weight value of a second target of the audio-visual map, the second target corresponding to a second participant; and increment a first conversational weight value of the first target and a second conversational weight value of the second target when the first talker weight value of the first target and second talker weight value of the second target each exceed a third threshold and an absolute value of a difference between the first talker weight value of the first target and the second talker weight value of the second target does not exceed a fourth threshold, and wherein the instructions to select one or more sub-frames further comprise instructions to select a third sub-frame depicting the first target and the second target when the first conversational weight value of the first target and the second conversational weight value of the second target each exceed a fifth threshold.

22. A method for determining a camera framing in a teleconferencing system, comprising: a process loop including: acquiring an audio-visual frame comprising: capturing a video data frame taking from a camera device; detecting objects and extracting image features of the objects within the video data frame; receiving, from a microphone device, an audio data frame, the audio data frame associated in time with the video data frame; evaluating the audio data frame to generate a sound source location; ingesting the audio-visual frame into a computer vison map (CVM) which includes a plurality of target objects having a plurality of weights indicative of meeting contexts; inferring a meeting scene context by evaluating the CVM; and framing subjects of interest under a framing model based on the meeting scene context.

23. The method of example 22, wherein the objects are a plurality of faces in the video data frame.

24. The method of example 23, wherein the image features comprise bounding box data and landmark data of the faces.

25. The method of example 23, wherein the weights comprise at least one of face weight, talk weight, conversation weight and gaze weight of each of the plurality of faces.

26. The method of example 25, wherein the weights further comprising a silent weight to evaluate a room silence.

27. The method of example 22, wherein each weight of the plurality of weights comprises parameter values which include initial value, threshold, max value, increment value, decrement value and floor value.

28. The method of example 27, wherein the parameter values of the plurality of weights are managed using a cumulative moving algorithm.

29. The method of example 22, wherein a TVPR algorithm is used to infer the meeting scene context.

30. The method of example 22, wherein the meeting scene context is a silent scene, a speaker scene, a conversation scene or a presenter scene.

31. The method of example 23, wherein the objects further comprising heads, human bodies, whiteboard in a conference room, or a product showing on the conference room.

32. The method of example 22, wherein a duration of each cycle of the process loop is 400 milliseconds to 5 seconds.

33. The method of example 32, wherein the duration of each cycle is 2 seconds.

34. The method of example 22, wherein the framing model is a speaker framing model, a group framing model, a conversation tracking model, a subject framing model, or a presenter tracking model.

35. A system for determining a camera framing in a teleconferencing system, comprising: a camera device; a microphone device; a video module configured to capture a video data frame taking from the camera device and to detect objects and extracting image features of the objects within the video data frame; an audio module configured to receive, from the microphone device, an audio data frame, the audio data frame associated in time with the video data frame and to assess the audio data frame to generate a sound source location; a control module configured to receive data from the video module and the audio module to form an audio-visual frame; and ingest the audio-visual frame into a computer vison map (CVM) which includes a plurality of target objects having a plurality of weights indicative of meeting contexts; infer a meeting scene context by evaluating the CVM; control the camera device to frame subjects of interest under a framing model based on the meeting scene context.

36. The system of example 35, wherein the objects are a plurality of faces in the video data frame.

37. The system of example 36, wherein the image features comprising bounding box data and landmark data of the faces.

38. The system of example 35, wherein each of the plurality of weights comprising parameter values which include initial value, threshold, max value, increment value, decrement value and floor value.

39. The system of example 38, wherein the parameter values of the plurality of weights are managed in accordance with a cumulative moving algorithm.

40. The system of example 35, wherein a TVPR algorithm is used to infer the meeting scene context.

41. The system of example 35, wherein the meeting scene context is a silent scene, a speaker scene, a conversation scene or a presenter scene.

The various examples described are provided by way of illustration and should not be construed to limit the scope of the disclosure. Various modifications and changes can be made to the principles and examples described herein without departing from the scope of the disclosure and without departing from the claims which follow.

The invention claimed is:

1. A video framing method in a teleconferencing system, the method comprising:
    receiving a first audio-video stream;
    deriving a first sound source location from a first plurality of audio frames of the first audio-video stream;
    updating a first talker weight value of a first participant when the first sound source location corresponds to the first participant;
    deriving a second sound source location from a second plurality of audio frames of the first audio-video stream;
    updating a second talker weight value of a second participant when the second sound source location corresponds to the second participant;
    updating a conversation weight value of the first participant and the second participant when the first talker weight value and the second talker weight value exceed a first threshold and a difference between the first talker weight value and the second talker weight value is less than a predetermined amount;
    selecting a first video sub-frame depicting the first participant for transmission in a second audio-video stream to a remote endpoint when the first talker weight value exceeds a second threshold; and
    selecting a second video sub-frame depicting the first participant and the second participant for transmission in the second audio-video stream to the remote endpoint when the conversation weight value exceeds a third threshold.

2. The method of claim 1, further comprising:
    selecting a third video sub-frame depicting the second participant for transmission in the second audio-video stream to the remote endpoint when the second talker weight value exceeds the second threshold.

3. The method of claim 1, further comprising:
    updating the conversation weight value of the first participant and the second participant when the first participant makes one or more hand gestures directed toward the second participant.

4. The method of claim 1, further comprising:
updating the conversation weight value of the first participant and the second participant when the first participant looks toward the second participant.

5. The method of claim 4, wherein updating the conversation weight value of the first participant and the second participant when the first participant looks toward the second participant comprises estimating at least one of a head pose or an eye gaze of the first participant.

6. The method of claim 5, wherein estimating at least one of the head pose or the eye gaze of the first participant comprises analyzing, using an artificial neural network, a plurality of video sub-frames depicting the first participant.

7. The method of claim 6, wherein the artificial neural network is a convolutional neural network.

8. A non-transitory computer readable medium storing instructions executable by a processor, wherein the instructions comprise instructions to:
receive a first audio-video stream at a first endpoint;
derive a first sound source location from a first plurality of audio frames of the first audio-video stream;
update a first talker weight value of a first participant when the first sound source location corresponds to the first participant;
derive a second sound source location from a second plurality of audio frames of the first audio-video stream;
update a second talker weight value of a second participant when the second sound source location corresponds to the second participant;
update a conversation weight value of the first participant and the second participant when the first talker weight value and the second talker weight value exceed a first threshold and a difference between the first talker weight value and the second talker weight value is less than a predetermined amount;
select a first video sub-frame depicting the first participant for transmission in a second audio-video stream to a second endpoint when the first talker weight value exceeds a second threshold; and
select a second video sub-frame depicting the first participant and the second participant for transmission in the second audio-video stream to the second endpoint when the conversation weight value exceeds a third threshold.

9. The non-transitory computer readable medium of claim 8, wherein the instructions further comprise instructions to:
select a third video sub-frame depicting the second participant for transmission in the second audio-video stream to the second endpoint when the second talker weight value exceeds the second threshold.

10. The non-transitory computer readable medium of claim 8, wherein the instructions further comprise instructions to:
update the conversation weight value of the first participant and the second participant when the first participant makes one or more hand gestures directed toward the second participant.

11. The non-transitory computer readable medium of claim 8, wherein the instructions further comprise instructions to:
update the conversation weight value of the first participant and the second participant when the first participant looks toward the second participant.

12. The non-transitory computer readable medium of claim 11, wherein the instructions to update the conversation weight value of the first participant and the second participant when the first participant looks toward the second participant comprise instructions to evaluate at least one of a head pose or an eye gaze of the first participant.

13. The non-transitory computer readable medium of claim 12, wherein the instructions to evaluate at least one of the head pose or the eye gaze of the first participant further comprise instructions to analyze a plurality of video sub-frames depicting the first participant, using an artificial neural network.

14. The non-transitory computer readable medium of claim 13, wherein the instructions to estimate at least one of the head pose or the eye gaze of the first participant further comprise instructions to analyze the plurality of video sub-frames depicting the first participant, using a convolutional neural network.

15. A teleconferencing endpoint, comprising:
a network interface;
a camera system;
a microphone system;
a processor, the processor coupled to the network interface, the camera system, and the microphone system; and
a memory, the memory storing instructions executable by the processor, wherein the instructions comprise instructions to:
capture a first audio-video stream using the camera system and the microphone system;
derive a first sound source location from a first plurality of audio frames of the first audio-video stream;
update a first talker weight value of a first participant when the first sound source location corresponds to the first participant;
derive a second sound source location from a second plurality of audio frames of the first audio-video stream;
update a second talker weight value of a second participant when the second sound source location corresponds to the second participant;
update a conversation weight value of the first participant and the second participant when the first talker weight value and the second talker weight value exceed a first threshold and a difference between the first talker weight value and the second talker weight value is less than a predetermined amount;
select a first video sub-frame depicting the first participant for transmission in a second audio-video stream to a second teleconferencing endpoint through the network interface, when the first talker weight value exceeds a second threshold; and
select a second video sub-frame depicting the first participant and the second participant for transmission in the second audio-video stream to the second teleconferencing endpoint when the conversation weight value exceeds a third threshold.

16. The teleconferencing endpoint of claim 15, wherein the instructions further comprise instructions to:
select a third video sub-frame depicting the second participant for transmission in the second audio-video stream to the second teleconferencing endpoint when the second talker weight value exceeds the second threshold.

17. The teleconferencing endpoint of claim 15, wherein the instructions further comprise instructions to:
    update the conversation weight value of the first participant and the second participant when the first participant makes one or more hand gestures directed toward the second participant.

18. The teleconferencing endpoint of claim 15, wherein the instructions further comprise instructions to:
    update the conversation weight value of the first participant and the second participant when the first participant looks toward the second participant.

19. The teleconferencing endpoint of claim 18, wherein the instructions to update the conversation weight value of the first participant and the second participant when the first participant looks toward the second participant comprise instructions to evaluate at least one of a head pose or an eye gaze of the first participant.

20. The teleconferencing endpoint of claim 19, wherein the instructions to evaluate at least one of the head pose or the eye gaze of the first participant further comprise instructions to analyze, using an artificial neural network, a plurality of video sub-frames depicting the first participant.

\* \* \* \* \*